US008001102B2

(12) United States Patent
Szeto et al.

(10) Patent No.: US 8,001,102 B2
(45) Date of Patent: *Aug. 16, 2011

(54) INTEGRATION OF INSTANT MESSAGING WITH INTERNET SEARCHING

(75) Inventors: Christopher T. Szeto, Sunnyvale, CA (US); Raymond Chung-Man Tam, San Francisco, CA (US)

(73) Assignee: Yahoo! Inc., Sunnyvale, CA (US)

( * ) Notice: Subject to any disclaimer, the term of this patent is extended or adjusted under 35 U.S.C. 154(b) by 495 days.

This patent is subject to a terminal disclaimer.

(21) Appl. No.: 12/167,147

(22) Filed: Jul. 2, 2008

(65) Prior Publication Data

US 2008/0288467 A1    Nov. 20, 2008

Related U.S. Application Data

(63) Continuation of application No. 10/828,514, filed on Apr. 19, 2004, now Pat. No. 7,409,384.

(51) Int. Cl.
*G06F 7/00* (2006.01)
*G06F 17/30* (2006.01)

(52) U.S. Cl. .................................................... 707/706
(58) Field of Classification Search .................. None
See application file for complete search history.

(56) References Cited

U.S. PATENT DOCUMENTS

| 6,785,679 | B1 | 8/2004 | Dane et al. |
| 6,968,179 | B1 | 11/2005 | De Vries |
| 2002/0091936 | A1 | 7/2002 | Tema |
| 2002/0167539 | A1 | 11/2002 | Brown et al. |
| 2003/0065721 | A1 | 4/2003 | Roskind |
| 2004/0122810 | A1 | 6/2004 | Mayer |
| 2004/0179039 | A1 | 9/2004 | Blattner et al. |
| 2005/0086211 | A1 | 4/2005 | Mayer |

FOREIGN PATENT DOCUMENTS

| EP | 1 288 795 A1 | 3/2003 |
| WO | WO-2004/046876 A1 | 6/2004 |
| WO | WO-2004/046948 A1 | 6/2004 |

OTHER PUBLICATIONS

Anonymous. (2003). "ICQ Pro Tour—Advanced Mode:Status Web Search," available from http://www.icq.com, ICQ, Inc. Dulles, VA.
Anonymous. (2003). "ICQ Features Catalog—Your ICQ Choices," available from http://www.icq.com, ICQ, Inc. Dulles, VA.
Bishop. (May 2003). "You Got a Telegram. No Its Instant Messaging," The Internet Times online column.

(Continued)

*Primary Examiner* — Uyen T. Le
(74) *Attorney, Agent, or Firm* — James J. DeCarlo; Greenberg Traurig, LLP

(57) ABSTRACT

Techniques for integrating instant messaging with Internet search features are provided. An instant messaging (IM) application allows users to launch a search of the Internet or the World Wide Web for information about another IM user or another topic. If an IM user wishes to locate information relating to a friend, a search is performed through a database of registered IM members to locate a user profile for the friend. If the friend's profile is found, the profile is displayed to the IM user. An IM application can link to an Internet search engine to search the Internet for web sites relating to the topic or person. Search results from an Internet search can be sorted based on information about a friend that is stored in the friend's user profile.

20 Claims, 2 Drawing Sheets

OTHER PUBLICATIONS

Esenther. (May 2002). "Instant Co-Browsing: Lightweight Real-time Collaborative Web Browsing," Conference Proceedings of the Eleventh International World Wide Web Conference (WWW2002), Waikiki, HI.

International Search Report mailed Nov. 3, 2005, for International Patent Application PCT/US2005/013311, filed on Apr. 19, 2005, 5 pages.

Jensen, C. et al. (Apr. 2002). "Finding Others Online: Reputation Systems for Social Online Spaces," CHI 2002 Conference Proceedings, Conference on Human Factors in Computing Systems, Minneapolis, Minnesota, USA, Apr. 20-25, 2002, ACM, New York, New York, USA, 41(1):447-454.

Kautz, Henry et al. (Mar. 1997). "Combining Social Networks and Collaborative Filtering, "Communications of the ACM, 40(3):63-65.

Mutton, Paul (Jul. 2004). "Inferring and Visualizing Social Networks on Internet Relay Chat," Proceedings of the Eighth International Conference on Information Visualization (IV '04), London, England Jul. 14-16, 2004, Piscataway, New Jersey, USA, IEEE, Jul. 14, 2004, pp. 35-43.

INTEGRATION OF INSTANT MESSAGING WITH INTERNET SEARCHING

CROSS-REFERENCE TO RELATED APPLICATIONS

This application is a Continuation of U.S. Ser. No. 10/828,514, now issued as U.S. Pat. No. 7,409,384, filed Apr. 19, 2004, which is hereby incorporated by reference in its entirety for all purposes.

BACKGROUND OF THE INVENTION

The present invention provides techniques for integrating instant messaging with Internet search features, and more particularly, to techniques for initiating Internet searches with an instant messaging application.

The Internet offers various ways for users to communicate with other users, such as instant messaging. Instant messaging (IM) has become increasingly popular. Instant messaging provides communication within a closed community, i.e., only registered users can send or receive messages via an instant messaging service. Users are required to sign in to the same system (or possibly the same server) with a pre-selected user name and password before sending messages.

Instant messaging software typically allows a user to define a list of "friends" (i.e., other registered users with whom the user wishes to communicate) and to reject or ignore messages sent by other users. An IM user can create a user profile that contains personal information about the user. An IM user can access a friend's user profile through the IM software to see what information the friend has published about himself or herself.

Often IM users have a desire to search the Internet to locate more information about other IM users. An IM user may also want to search the Internet to locate information about topics that are related to an active IM conservation. Current IM applications do not allow a user to link directly to the Internet to perform searches. Therefore, an IM user must manually open a separate web browser window to link to an Internet search engine web page. After typing in search criteria into the Internet search engine web page, the IM user typically has to manually flip through numerous search results to locate web sites that are relevant to another IM user or to a particular topic.

Therefore, it would be desirable to provide techniques for integrating instant messaging with Internet search capabilities.

BRIEF SUMMARY OF THE INVENTION

The present invention provides techniques for integrating instant messaging with Internet search features. An instant messaging (IM) application or client of the present invention allows users to launch an Internet search for information about a friend or another topic.

If an IM user wishes to locate information relating to a friend, a search is performed through a database of registered IM members to locate a user profile for the friend. If the friend's profile is found, the profile is displayed to the IM user.

An IM application can also launch an Internet search for information relating to a topic or a friend (e.g., a World Wide Web search). The IM application can link to an Internet search server to search the Internet for web sites relating to the topic or person. Search results from an Internet search can be sorted based on information about a friend that is stored in the friend's user profile. The Internet search results and the user profile can be displayed together in a web browser window generated by a web browser application.

The following detailed description together with the accompanying drawings will provide a better understanding of the nature and advantages of the present invention.

DETAILED DESCRIPTION OF THE INVENTION

Figure 1:
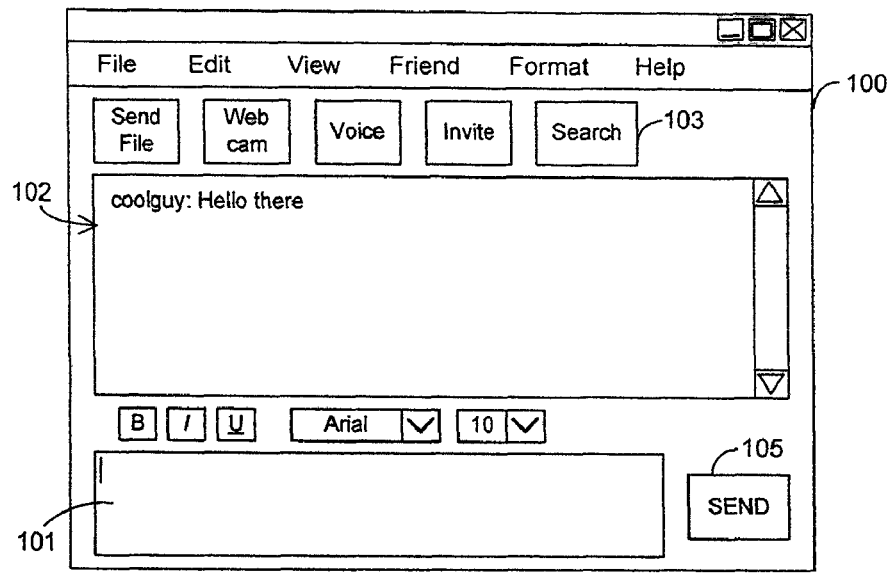
FIG. 1 illustrates an example of an instant messaging display screen with a search button according to an embodiment of the present invention.

FIG. 1 illustrates an example of a computer display screen 100 provided by an instant messaging application or client according to the present invention. An instant messaging (IM) user types messages in region 101. The message in region 101 is sent to a recipient IM user when the sender selects send option 105. Sent and received instant messages are displayed in region 102.

The instant messaging application that generated screen 100 has an Internet search feature according to the present invention. Display screen 100 includes a search button 103 in the main toolbar of the message window that links to the Internet search feature of the present invention. An IM user can also link to the Internet search feature by typing a shortcut key (e.g., Ctrl+E) or by selecting a menu item can be entitled, for example, "Search the Web for [display name]." The menu item can be displayed from a drop down list at the tope of screen 100, or from a list that is displayed when the IM user clicks the right side mouse button. The menu item can also be displayed in an electronic Address Book.

Figure 2:
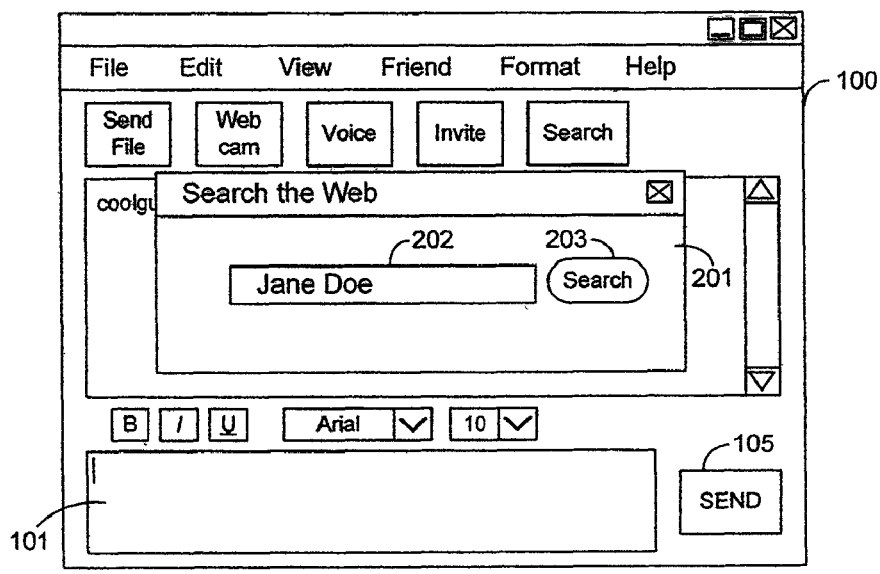
FIG. 2 illustrates dialog box launched by an instant messaging application for performing an Internet search according to an embodiment of the present invention.

After the user selects one of the options that links to the Internet search feature, a web search dialog box 201 appears, as shown, for example, in FIG. 2. The IM application can automatically display the name of a friend in region 202. For example, the IM application can display the name of the friend that the IM user is sending instant messages to in screen 100.

The IM application can automatically form the display name in region 202 using the following information about the friend in the following order based on the availability of this information, (1) first name and last name of the friend from an address book, (2) the friend's nickname from the address book, and (3) the friend's identification (ID) number (e.g., Yahoo! ID). This information is used to pre-fill search box 201 with a friend's display name. The query string is highlighted so that the IM user can simply hit Enter to execute an Internet search of the highlighted friend.

Alternatively, the IM user can manually type in the user name or number of another IM user in region 202. The IM user can select search option 203 to launch an Internet web search for the user or topic in displayed in region 202.

According to further embodiments of the present invention, the IM user can type in a search query in region 202 to launch a search for information relating to any topic. For example, an IM user may by planning a vacation with a friend that he is sending instant messages to in screen 100. The IM user can launch an Internet web search to check for tourist information about Paris, France by typing in search terms in region 202. The IM application automatically opens up a web browser to search the Internet for a friend or another topic when the user selects one of the IM search options mentioned above.

Figure 3:
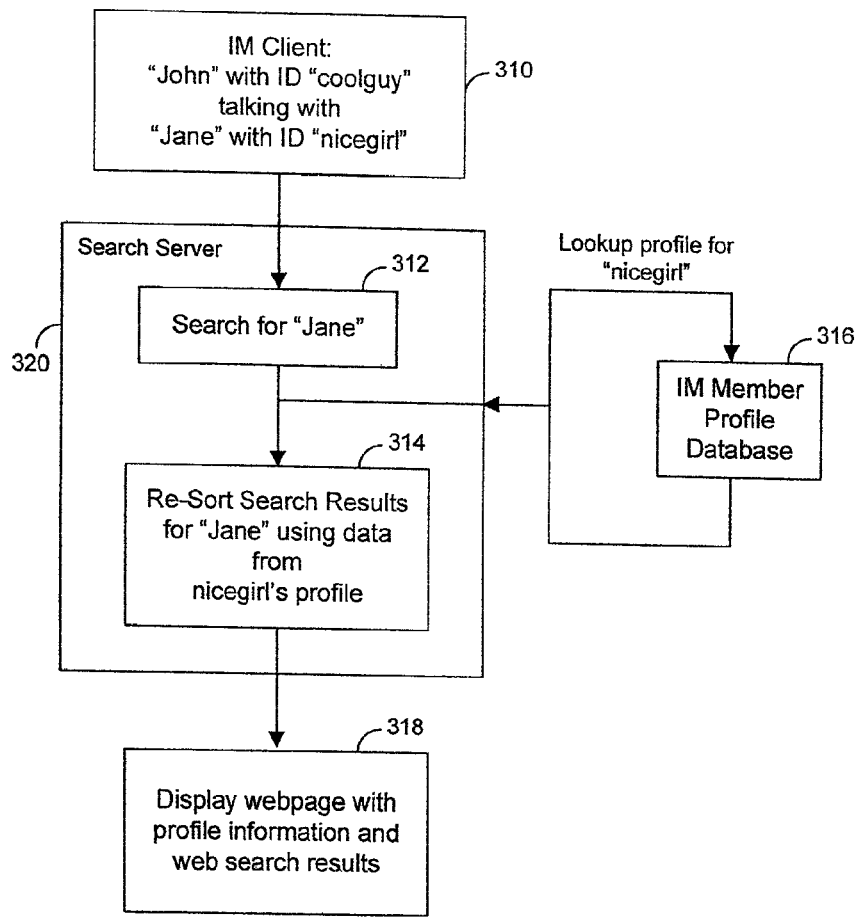
FIG. 3 is a diagram of a system that can be used to implement instant messaging Internet search features and a flow chart according to embodiments of the present invention.

FIG. 3 illustrates a system diagram that can implement embodiments of the present invention. The system includes search server 320, instant messaging client 310, and IM member profile database 316. IM client can contain any suitable IM application such as Yahoo! IM, AOL IM, MSN IM, etc.

Only one IM client is shown in FIG. 3 for simplicity. However, search server 320 can communicate with many IM clients. Search server 320 can contain any Internet search engine. Search server 320 performs a search through the Internet or the World Wide Web for information relating to the search query In the example shown in FIG. 3, a user named "John" has a user ID "coolguy." John is instant messaging a user named "Jane" who has a user ID "nicegirl" through IM client 310. After John indicates that he wants to perform an Internet search for "Jane," IM client 310 transmits a search query to search server 320. Search server 320 performs an Internet web search for "Jane" using well know Internet and web searching techniques at step 312 and sorts the search results according to their relevance to the search query.

FIG. 3 also includes an IM member profile database 316. IM member profile database 316 stores user profiles of IM members. Search server 320 looks up the user profile for "nicegirl" in IM member profile database 316. At step 314, search server 320 re-sorts the search results for "Jane" from step 312 using the data from nicegirl's profile accessed from database 316. the search results from step 312 are re-sorted according to their relevance to data in nicegirl's user profile. At step 318, the re-sorted web search results are displayed to the user John on IM client 310 in a new web browser window along with the user profile for "nicegirl."

In one embodiment of the present invention, IM client 310 transmits a universal resource locator (URL) that identifies the Internet search query to search server 320. The URL can be in a variety of formats. For example, the IM client can transmit a URL to search server 320 in a URL format that contains a user ID and/or user name. The IM member user's ID and a user name are part of this URL string. Search server 320 uses the user information in the URL to locate web sites that relate to the IM member user. Search server 320 also uses the IM member information in the URL to retrieve the user profile of the IM member from database 316. There can also be different search URL's that are based on the user's IP, which will also include a character set parameter if necessary.

Figure 4:
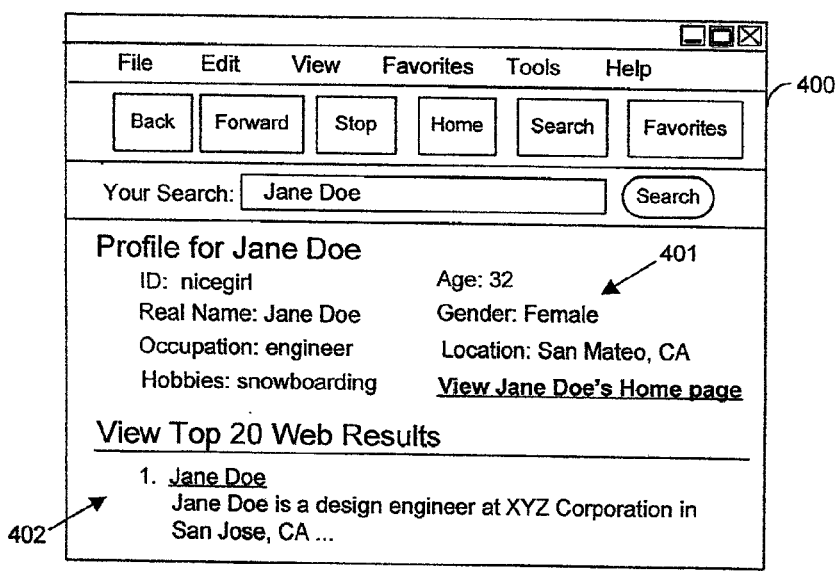
FIG. 4 illustrates an example of a screen that displays results from a search launched from an instant messaging application according to an embodiment of the present invention.

FIG. 4 illustrates a screen that displays results from an example IM search of the present invention. Screen 400 displays a user profile 401 for Jane Doe, who has a user ID "nicegirl." In the example of FIG. 4, screen 400 displays a user profile 401. The user profile is based on the user ID. Blank fields are typically not displayed in profile 401.

Screen 400 also displays search results 402 from an Internet web search for Jane Doe. According to an embodiment of the present invention, the search results 402 are sorted according to information about a person stored in a user profile from database 316. Search server 320 accesses user profiles from database 316. Search server 320 uses data in a user profile to identify which web sites are most likely to be relevant to the search-for friend. Search server 320 then places the web sites that are most relevant to the friend's user profile at the top of the list of search results. This allows the searching IM user to view the most relevant search results first.

For example, Jane Doe may add links to her home page in her IM user profile 401. Jane Doe's user profile information is accessed from database 316. Search server 320 uses Jane Doe's user profile information to sort search results retrieved from an Internet web search for "Jane Doe." Web sites that mention information in Jane Doe's profile are sorted above other search results.

This feature is advantageous, because it helps an IM user identify web sites that are related to the friend being searched. Search server 320 may retrieve web sites that refer to several different people with the same name. For example, if Member A's name is Jane Doe, it is likely that search server 320 will retrieve web sites that relate to many different Jane Does. If Jane Doe's user profile indicates that she attended MIT, works at XYZ corporation, and lists a homepage URL, web site hits containing these terms are sorted at the top of the list of search results. This feature of the present invention helps the searching IM user to distinguish between webs sites that mention Jane Doe the XYZ corporation employee and MIT graduate, from web sites that mention other Jane Does.

Thus, a user can influence the search results when his or her friends use IM to search the Internet for him/her. A user can add specific information to his or her user profile to help his or her friends locate relevant web pages. For example, a user profile can include a member's real name, nickname, location, age, gender, martial status, occupation, hobbies, latest news, quotes, homepage link, cool links to other web sites, a last updated date, and a picture/avatar. All of this information helps to identify the user and to distinguish him or her from other individuals. Search server 320 can use any or all of this information to sort the search results.

While the invention has been described with respect to specific embodiments, one skilled in the art will recognize that numerous modifications are possible. The various components of an instant messaging system may be implemented using hardware components, programmable devices (e.g., microprocessors) executing software instructions, and any combination thereof. "Instant messaging" as used herein is not limited to any particular protocol, format, delivery method, or form factor and includes messages delivered according to any protocol that enables communication among a closed community of authenticated users. Thus, although the invention has been described with respect to specific embodiments, it will be appreciated that the invention is intended to cover all modifications and equivalents within the scope of the following claims.

We claim:

1. A method for performing an Internet search launched from an instant messaging (IM) application, the method comprising:
   receiving, by a computing device, a search query from a first IM user for an Internet search of a second IM user, the search query initiated by user input to the IM application;
   initiating, by the computing device, a search of the Internet for web pages based on information associated with the second IM user to generate search results; and
   causing, by the computing device, communication of at least a portion of the search results to the first IM user.

2. The method according to claim 1, wherein the information associated with the second IM user is retrieved from a user profile associated with the second IM user.

3. The method according to claim 1, further comprising accessing, by the computing device, a user profile associated with the second IM user for use in the search.

4. The method according to claim 1, further comprising sorting, by the computing device, the search results based on information associated with the second IM user.

5. The method according to claim 1, further comprising transmitting, by the computing device, the search query to a search server.

6. The method according to claim 5, wherein transmitting the search query further comprises transmitting a URL that contains an ID identifying the second IM user to the search server.

7. The method according to claim 1, wherein the communicated search results are displayed in a web browser window generated by a web browser application.

8. A computer-readable storage medium comprising instructions executed by a processor for performing an Internet search launched from an instant messaging (IM) application, the instructions comprising:
   code executed by the processor for initiating a search of the Internet in response to search request from user input by a first IM user, the search based on information associated with a second IM user; and
   code executed by the processor for causing communication of at least one search result to the first IM user in response to the search.

9. The computer-readable storage medium according to claim 8, further comprising code executed by the processor for transmitting a search query identifying the second IM user to a search server.

10. The computer-readable storage medium according to claim 8, further comprising code executed by the processor for accessing a user profile of the second IM user from an IM member profile database for use in the search.

11. The computer-readable storage medium according to claim 8, further comprising code executed by the processor for causing display of the at least one search result to the first IM user.

12. The computer-readable storage medium according to claim 8, further comprising code executed by the processor for sorting the search results in order of relevance to information in the user profile of the second IM user.

13. The computer-readable storage medium according to claim 12, wherein the code for displaying the sorted search results further comprises displaying a user profile of the second IM user along with the search results.

14. The computer-readable storage medium according to claim 8, wherein the at least one search result is displayed in a web browser window generated by a web browser application.

15. Apparatus for performing an Internet search launched from an instant messaging (IM) application, the apparatus comprising a server computer comprising a processor and operable for:
   receiving, by the server computer, a request from a first IM user for an Internet search of a second IM user, the search request received by the server computer via user input to the IM application;
   causing, by the server computer, a search of the Internet based on information associated with the second IM user; and
   communicating, by the server computer, at least one of the results of the search to the first IM user.

16. The apparatus according to claim 15, wherein the server computer is further operable to cause sorting of the results of the search based on information in a user profile of the second IM user.

17. The apparatus according to claim 15, wherein the information associated with the second IM user is retrieved from a user profile associated with the second IM user.

18. The apparatus according to claim 15, further comprising accessing a user profile associated with the second IM user for use in the search.

19. The apparatus according to claim 15, further comprising sorting the search results based on information associated with the second IM user.

20. The apparatus according to claim 15, further comprising transmitting the search query to a search server.

* * * * *